(12) United States Patent
Rao et al.

(10) Patent No.: US 11,409,892 B2
(45) Date of Patent: Aug. 9, 2022

(54) ENHANCING SECURITY DURING ACCESS AND RETRIEVAL OF DATA WITH MULTI-CLOUD STORAGE

(71) Applicant: INTERNATIONAL BUSINESS MACHINES CORPORATION, Armonk, NY (US)

(72) Inventors: Shruthi Rs Rao, Bangalore (IN); Juilee A. Joshi, Pune (IN); Sahana H. Anantharajaiah, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 254 days.

(21) Appl. No.: 16/117,636

(22) Filed: Aug. 30, 2018

(65) Prior Publication Data
US 2020/0074096 A1     Mar. 5, 2020

(51) Int. Cl.
*G06F 21/62*     (2013.01)
*G06F 21/60*     (2013.01)
(Continued)

(52) U.S. Cl.
CPC ........ *G06F 21/6218* (2013.01); *G06F 16/137* (2019.01); *G06F 16/178* (2019.01); *G06F 16/1744* (2019.01); *G06F 21/602* (2013.01)

(58) Field of Classification Search
CPC ........ G06F 3/067; G06F 3/064; G06F 3/0683; G06F 3/0638; G06F 21/6218;
(Continued)

(56) References Cited

U.S. PATENT DOCUMENTS

| 8,677,132 B1 * | 3/2014 | Liao | H04L 9/321 |
| | | | 713/176 |
| 8,965,956 B2 * | 2/2015 | Palthepu | G06F 16/182 |
| | | | 709/203 |

(Continued)

FOREIGN PATENT DOCUMENTS

| CA | 2839072 C | 7/2014 |
| CN | 104754055 A | 7/2015 |

OTHER PUBLICATIONS

Anonymous, "An IT pro's survival guide for multicloud computing", SearchCloudComputing, https://searchcloudcomputing.techtarget.com/essentialguide/An-IT-pros-survival-guide-for-multicloud-computing, accessed Aug. 29, 2018, 9 pages.

(Continued)

*Primary Examiner* — Richard A McCoy
(74) *Attorney, Agent, or Firm* — Scott Dobson; Andrew D. Wright; Roberts Calderon Safran & Cole, P.C.

(57) ABSTRACT

Systems and methods for enhancing security during access and retrieval of data with multi-cloud storage are disclosed. A method includes: receiving, by a computing device, data to be stored in a distributed computing environment; compressing, by the computing device, the received data; shredding, by the computing device, the compressed data into a plurality of data chunks; storing, by the computing device, the plurality of data chunks in a plurality of locations in the distributed computing environment; generating, by the computing device, a metadata file including a mapping of each of the plurality of data chunks and a corresponding location of the plurality of locations in the distributed computing environment in which the data chunk is stored; shredding, by the computing device, the metadata file into a plurality of file chunks; and storing, by the computing device, the plurality of file chunks in the distributed computing environment.

20 Claims, 7 Drawing Sheets

(51) Int. Cl.
*G06F 16/13* (2019.01)
*G06F 16/178* (2019.01)
*G06F 16/174* (2019.01)

(58) Field of Classification Search
CPC .. G06F 16/137; G06F 16/1744; G06F 16/178; G06F 21/602; G06F 16/164; G06F 16/1724; G06F 16/13; G06F 16/134; G06F 16/14; H04L 67/1097
See application file for complete search history.

(56) References Cited

U.S. PATENT DOCUMENTS

| | | | | |
|---|---|---|---|---|
| 9,355,060 | B1* | 5/2016 | Barber | H04L 67/1097 |
| 9,378,091 | B2* | 6/2016 | Dhuse | H04N 7/17336 |
| 9,658,911 | B2* | 5/2017 | Resch | G06F 11/0757 |
| 9,727,588 | B1* | 8/2017 | Ostapovicz | G06F 3/0647 |
| 2003/0065656 | A1* | 4/2003 | de la Torre | G06F 11/1076 |
| 2006/0015945 | A1* | 1/2006 | Fields | H04L 67/2823 |
| | | | | 726/27 |
| 2007/0083850 | A1* | 4/2007 | Kapoor | G06F 9/44521 |
| | | | | 717/106 |
| 2007/0214105 | A1* | 9/2007 | Sfarti | H04L 67/1097 |
| 2007/0226224 | A1* | 9/2007 | Wanigasekara-Mohotti | |
| | | | | H04L 67/1097 |
| 2008/0071844 | A1* | 3/2008 | Gopal | G06F 16/254 |
| 2008/0244385 | A1* | 10/2008 | Zukowski | G06F 40/169 |
| | | | | 715/255 |
| 2009/0195927 | A1* | 8/2009 | Bondurant | G06F 21/80 |
| | | | | 360/133 |
| 2011/0107112 | A1* | 5/2011 | Resch | G06F 11/1004 |
| | | | | 713/193 |
| 2011/0145593 | A1* | 6/2011 | Auradkar | H04L 9/006 |
| | | | | 713/189 |
| 2012/0185437 | A1* | 7/2012 | Pavlov | H03M 13/611 |
| | | | | 707/652 |
| 2012/0233228 | A1* | 9/2012 | Barton | G06F 16/178 |
| | | | | 707/827 |
| 2013/0138862 | A1* | 5/2013 | Motwani | H04L 9/0825 |
| | | | | 711/5 |
| 2014/0006354 | A1* | 1/2014 | Parkison | G06F 3/067 |
| | | | | 707/649 |
| 2014/0006357 | A1* | 1/2014 | Davis | G06F 16/182 |
| | | | | 707/667 |
| 2015/0006846 | A1* | 1/2015 | Youngworth | G06F 3/0619 |
| | | | | 711/216 |
| 2016/0062837 | A1* | 3/2016 | Slik | G06F 3/0689 |
| | | | | 714/6.24 |
| 2017/0046530 | A1 | 2/2017 | Raj | |
| 2017/0098096 | A1 | 4/2017 | Redberg | |
| 2017/0193233 | A1 | 7/2017 | Lorini | |
| 2017/0293766 | A1* | 10/2017 | Schnjakin | G06F 21/335 |
| 2017/0331796 | A1* | 11/2017 | Crofton | H04L 67/1097 |
| 2018/0349396 | A1* | 12/2018 | Blagojevic | G06F 16/183 |
| 2019/0036648 | A1* | 1/2019 | Yanovsky | G06F 3/0623 |
| 2019/0079674 | A1* | 3/2019 | Singh | G06F 3/0604 |
| 2020/0097404 | A1* | 3/2020 | Cason | G06F 11/1471 |
| 2020/0349087 | A1* | 11/2020 | Kucherov | G06F 3/0685 |

OTHER PUBLICATIONS

Sullivan, "Howto effectively work with multiple cloud providers", https://searchcloudcomputing.techtarget.com/tip/How-to-effectively-work-with-multiple-cloud-providers?vgnextfmt=print, Apr. 28, 2016, 3 pages.

Coles, "9 Cloud Computing Security Risks Every Company Faces", McAfee, https://www.skyhighnetworks.com/cloud-security-blog/9-cloud-computing-security-risks-every-company-faces/, accessed Aug. 29, 2018, 6 pages.

Wall, "Can we trust cloud providers to keep our data safe?", BBC News, https://www.bbc.com/news/business-36151754, Apr. 29, 2016, 6 pages.

Anonymous, "A New World, A New Security Approach," Rackspace, https://dab35129f0361dca3159-2fe04d8054667ffada6c4002813eccf0.ssl.cf1.rackcdn.com/downloads/pdrs/RMS/RACKSPACE_MANAGED_SECURITY_SERVICES-Our_Security_Philosophy_Whitepaper.pdf, accessed Aug. 29, 2018, 4 pages.

Mell et al., "The NIST Definition of Cloud Computing", NIST, Special Publication 800-145, Sep. 2011, 7 pages.

* cited by examiner

ENHANCING SECURITY DURING ACCESS AND RETRIEVAL OF DATA WITH MULTI-CLOUD STORAGE

BACKGROUND

The present invention generally relates to computing devices and, more particularly, to systems and methods for enhancing security during access and retrieval of data with multi-cloud storage.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. Network storage is a computing capability that is typically offered by cloud computing providers. In particular, a user of cloud computing services may store and retrieve data on cloud infrastructure maintained by a cloud computing provider.

SUMMARY

In a first aspect of the invention, there is a method that includes: receiving, by a computing device, data to be stored in a distributed computing environment; compressing, by the computing device, the received data; shredding, by the computing device, the compressed data into a plurality of data chunks; storing, by the computing device, the plurality of data chunks in a plurality of locations in the distributed computing environment; generating, by the computing device, a metadata file including a mapping of each of the plurality of data chunks and a corresponding location of the plurality of locations in the distributed computing environment in which the data chunk is stored; shredding, by the computing device, the metadata file into a plurality of file chunks; and storing, by the computing device, the plurality of file chunks in the distributed computing environment.

In another aspect of the invention, there is a computer program product that includes a computer readable storage medium having program instructions embodied therewith. The program instructions are executable by a computing device to cause the computing device to: receive data to be stored in a distributed computing environment; shred the received data into a plurality of data chunks; store the plurality of data chunks in a plurality of locations in the distributed computing environment; generate a metadata file including a mapping of each of the plurality of data chunks and a corresponding location of the plurality of locations in the distributed computing environment in which the data chunk is stored; shred the metadata file into a plurality of file chunks; store the plurality of file chunks in the plurality of locations in the distributed computing environment; and generate a metadata of the metadata file including a mapping of each of the plurality of file chunks and a corresponding location of the plurality of locations in the distributed computing environment in which the file chunk is stored.

In another aspect of the invention, there is a system that includes: a hardware processor, a computer readable memory, and a computer readable storage medium associated with a computing device; program instructions configured to receive data to be stored in a distributed computing environment; program instructions configured to compress the received data; program instructions configured to shred the compressed data into a plurality of data chunks; program instructions configured to store the plurality of data chunks in a plurality of locations in the distributed computing environment; program instructions configured to generate a metadata file including a mapping of each of the plurality of data chunks and a corresponding location of the plurality of locations in the distributed computing environment in which the data chunk is stored; program instructions configured to shred the metadata file into a plurality of file chunks; and program instructions configured to store the plurality of file chunks in the plurality of locations in the distributed computing environment, wherein the program instructions are stored on the computer readable storage medium for execution by the hardware processor via the computer readable memory.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

Figure 1:
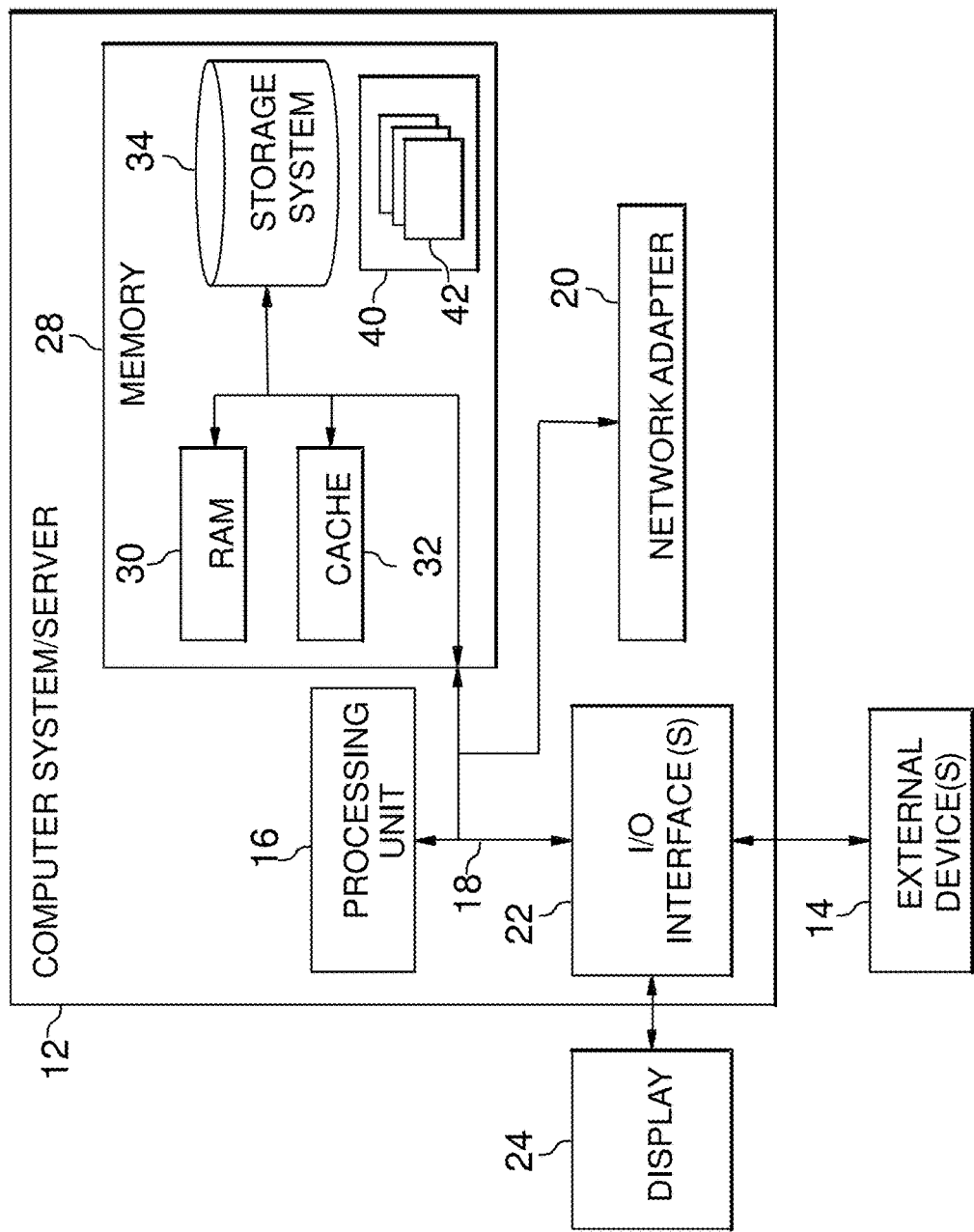
FIG. 1 depicts a cloud computing node in accordance with aspects of the invention.

The present invention generally relates to computing devices and, more particularly, to systems and methods for enhancing security during access and retrieval of data with multi-cloud storage. As described herein, aspects of the invention are directed to a system and method that provide for enhanced security while accessing data stored in a multi-cloud environment. In particular, security threats are minimized by distributing data across different vendors in the multi-cloud environment. Aspects of the invention receive encrypted data from a user and distribute the encrypted data across different locations in a distributed computing environment (e.g., different clouds operate by different vendors) that are selected using a hash algorithm. Additionally, metadata is encrypted and distributed across the different locations in the distributed computing environment. Aspects of the invention also replicate the encrypted and distributed data to improve data accessibility.

As more companies utilize distributed computing environments such as cloud computing environments to store sensitive data, security risks have increased. In particular, security incidents have occurred when data is stored with a single cloud provider. In embodiments, these security risks are minimized by distributing stored data across different cloud vendors in a multi-cloud environment. In particular, the risk of the stored data being accessed by an unauthorized user is minimized because the unauthorized user would have to: (1) hack through user-defined security features (e.g., password, etc.), (2) hack through the encryption implementation and other security features provided by each of the different cloud vendors in the multi-cloud environment, and (3) hack through the metadata, which is distributed across the different cloud vendors. Additionally, even if an unauthorized user does obtain a chunk of the stored data from one of the cloud vendors, the chunk of data is unusable on its own because the stored data is distributed across the different vendors in the multi-cloud environment.

Accordingly, embodiments of the invention improve the functioning of a computer by providing improved software and/or hardware that implements systems and methods for providing for enhanced security while accessing data stored in a multi-cloud environment. In particular, embodiments minimize security threats by distributing data across different vendors in the multi-cloud environment. Additionally, embodiments of the invention use systems and techniques that are, by definition, rooted in computer technology (e.g., distributed computing environments, cloud computing environments, multi-cloud environments, replication, etc.) that cannot be performed manually by a person.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
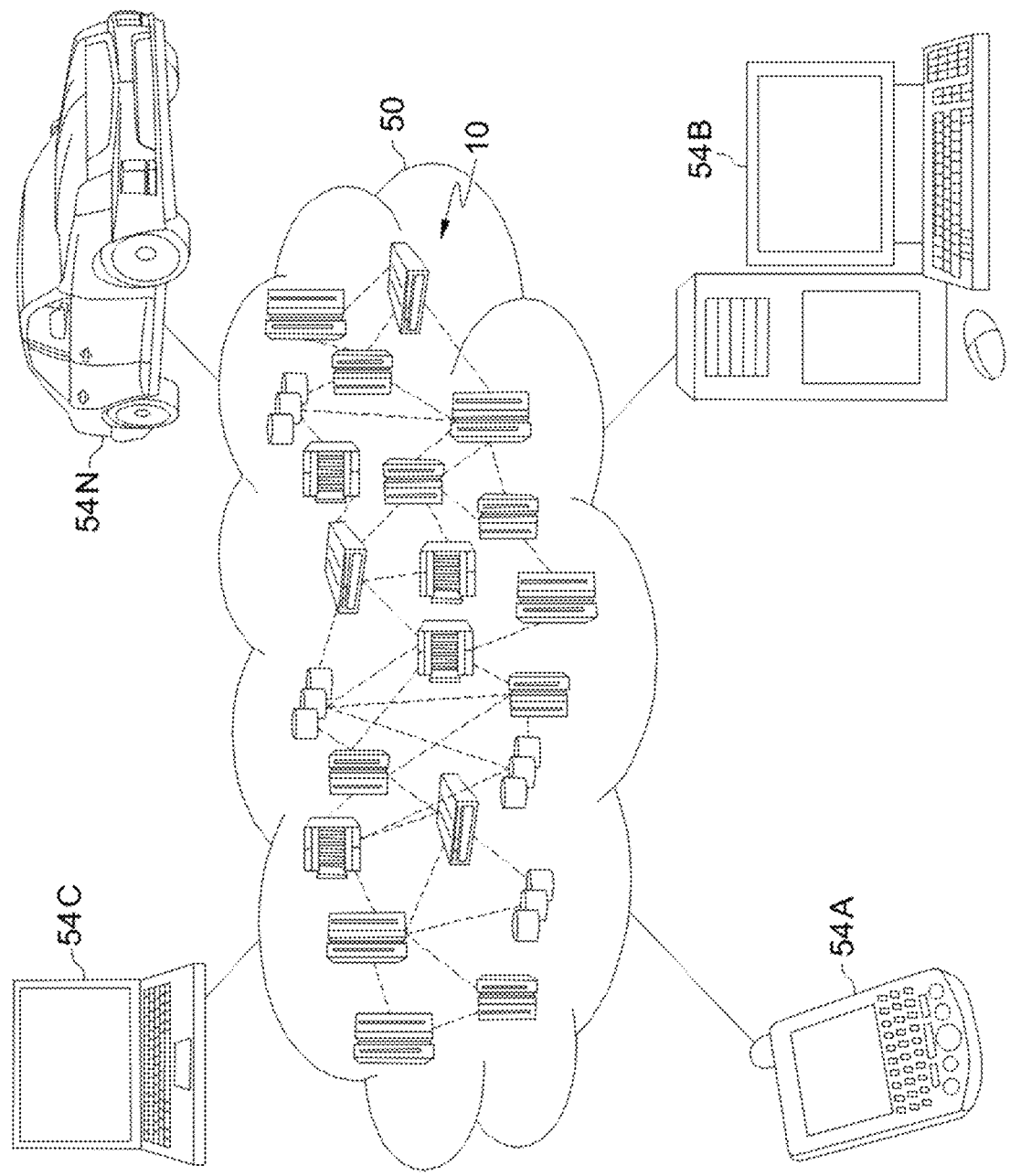
FIG. 2 depicts a cloud computing environment in accordance with aspects of the invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
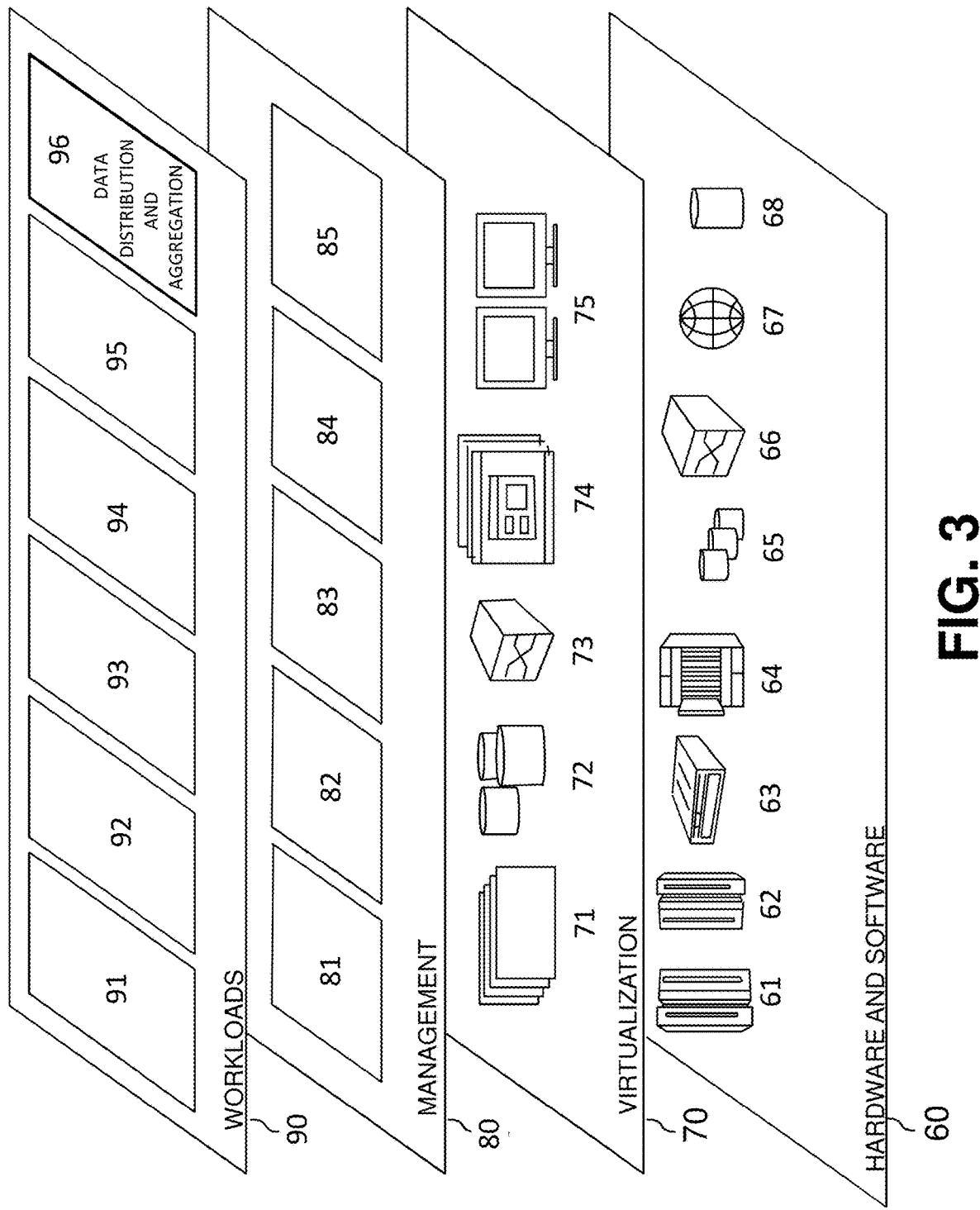
FIG. 3 depicts abstraction model layers in accordance with aspects of the invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and data distribution and aggregation 96.

Referring back to FIG. 1, the program/utility 40 may include one or more program modules 42 that generally carry out the functions and/or methodologies of embodiments of the invention as described herein (e.g., such as the functionality provided by data distribution and aggregation 96). Specifically, in embodiments, the program modules 42 receive encrypted data from a user and distribute the encrypted data onto different clouds that are selected using a hash algorithm. In additional embodiments, the program modules 42 encrypt metadata and distribute the encrypted metadata onto different clouds. Other functionalities of the program modules 42 are described further herein such that the program modules 42 are not limited to the functions described above. Moreover, it is noted that some of the modules 42 can be implemented within the infrastructure shown in FIGS. 1-3. For example, the modules 42 may be representative of a cloud computing server 410 as shown in FIG. 4.

Figure 4:
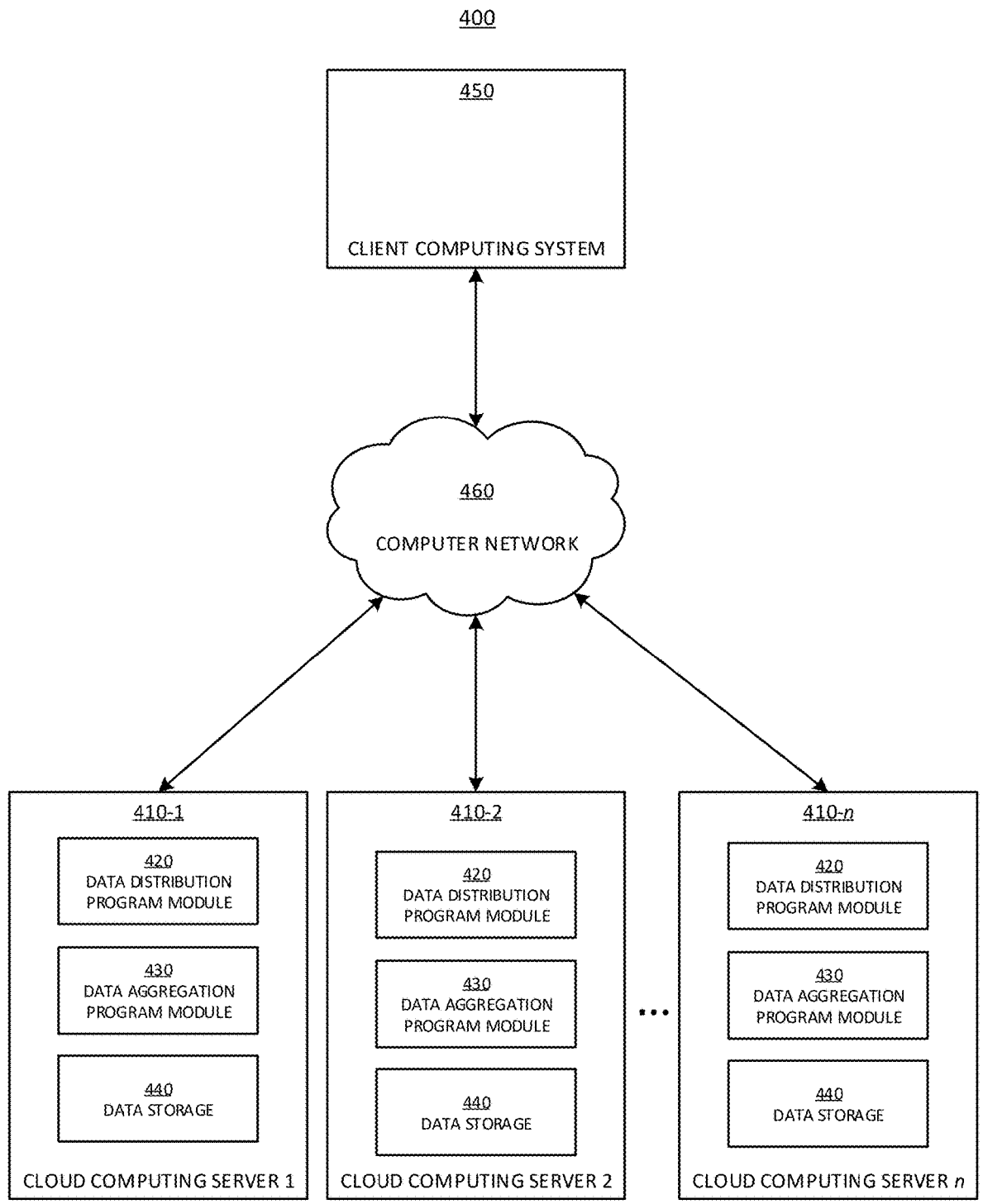
FIG. 4 depicts an illustrative environment in accordance with aspects of the invention.

FIG. 4 depicts an illustrative environment 400 in accordance with aspects of the invention. As shown, the environment 400 comprises a plurality of cloud computing servers 410-1, 410-2, . . . , 410-n and a client computer system 450 that are in communication with each other via a computer network 460. The computer network 460 may be any suitable network such as a LAN, WAN, or the Internet. In embodiments, the plurality of cloud computing servers 410-1, 410-2, . . . , 410-n and the client computer system 450 are physically collocated. More typically, in other embodiments, the plurality of cloud computing servers 410-1, 410-2, . . . , 410-n and the client computer system 450 are situated in separate physical locations.

The quantity of devices and/or networks in the environment 400 is not limited to what is shown in FIG. 4. In practice, the environment 400 may include additional devices and/or networks; fewer devices and/or networks; different devices and/or networks; or differently arranged devices and/or networks than illustrated in FIG. 4. Also, in some implementations, one or more of the devices of the environment 400 may perform one or more functions described as being performed by another one or more of the devices of the environment 400.

In embodiments, the plurality of cloud computing servers 410-1, 410-2, . . . , 410-n in the environment 400 are situated in the cloud computing environment 50 and are one or more of the nodes 10 shown in FIG. 2. The plurality of cloud computing servers 410-1, 410-2, . . . , 410-n are implemented as hardware and/or software using components such as mainframes 61; RISC (Reduced Instruction Set Computer) architecture based servers 62; servers 63; blade servers 64; storage devices 65; networks and networking components 66; virtual servers 71; virtual storage 72; virtual networks 73, including virtual private networks; virtual applications and operating systems 74; and virtual clients 75 shown in FIG. 3. In embodiments, each of the plurality of cloud computing servers 410-1, 410-2, . . . , 410-n are associated with a different vendor (e.g., a different cloud computing provider).

In embodiments, the each of the plurality of cloud computing servers 410-1, 410-2, . . . , 410-n includes a data distribution program module 420, a data aggregation program module 430, and data storage 440, each of which includes hardware and/or software and is one or more of the program modules 42 shown in FIG. 1. In another embodiment, some of the plurality of cloud computing servers 410-1, 410-2, . . . , 410-n omit the data distribution program module 420 and/or the data aggregation program module 430.

Still referring to FIG. 4, in embodiments, the data distribution program module 420 includes program instructions for receiving encrypted data from a user and distributing the encrypted data onto different clouds that are selected using a hash algorithm. Additionally, the data distribution program module 420 includes program instructions for encrypting metadata and distributing the encrypted metadata onto different clouds.

In embodiments, the data aggregation program module 430 includes program instructions for reconstructing metadata that was encrypted and distributed onto different clouds by the data distribution program module 420. Additionally, the data aggregation program module 430 includes program instructions for reconstructing the original encrypted data using the metadata and sending the reconstructed data to a user.

Still referring to FIG. 4, in embodiments, the data storage 440 receives and stores data in a storage resource provided by a cloud computing provider associated with the particular cloud computing server of the plurality of cloud computing servers 410-1, 410-2, . . . , 410-n on which the data storage 440 is located. The storage resource is any type of data storage device or system (e.g., storage device 65 of FIG. 3) and is located on the cloud computing server 410-1, 410-2, . . . , 410-n on which the data storage 440 is located or on another cloud computing node 10 or other location associated with the cloud computing provider.

In embodiments, the client computer system 450 in the environment 400 includes one or more components of the computer system/server 12 (as shown in FIG. 1). Alternatively, the client computer system 450 is implemented as hardware and/or software using components such as mainframes 61; RISC (Reduced Instruction Set Computer) architecture based servers 62; servers 63; blade servers 64; storage devices 65; networks and networking components 66; virtual servers 71; virtual storage 72; virtual networks 73, including virtual private networks; virtual applications and operating systems 74; and virtual clients 75 shown in FIG. 3. In other embodiments, the client computer system 450 is a desktop computer, a laptop computer, a mobile device such as a cellular phone, tablet, personal digital assistant (PDA), or any other computing device.

Figure 5:
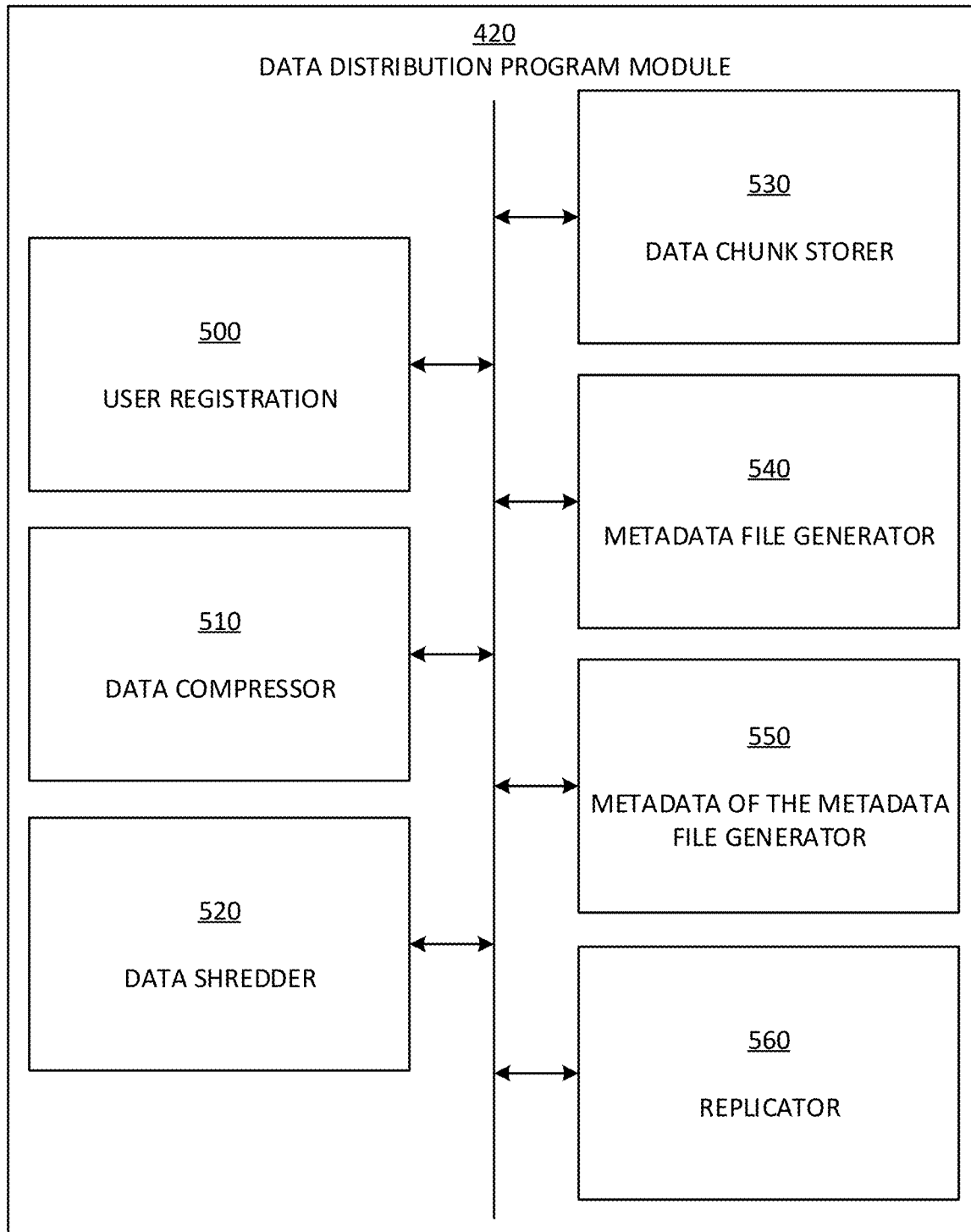
FIG. 5 depicts a block diagram of an exemplary program module in accordance with aspects of the invention.
Figure 6:
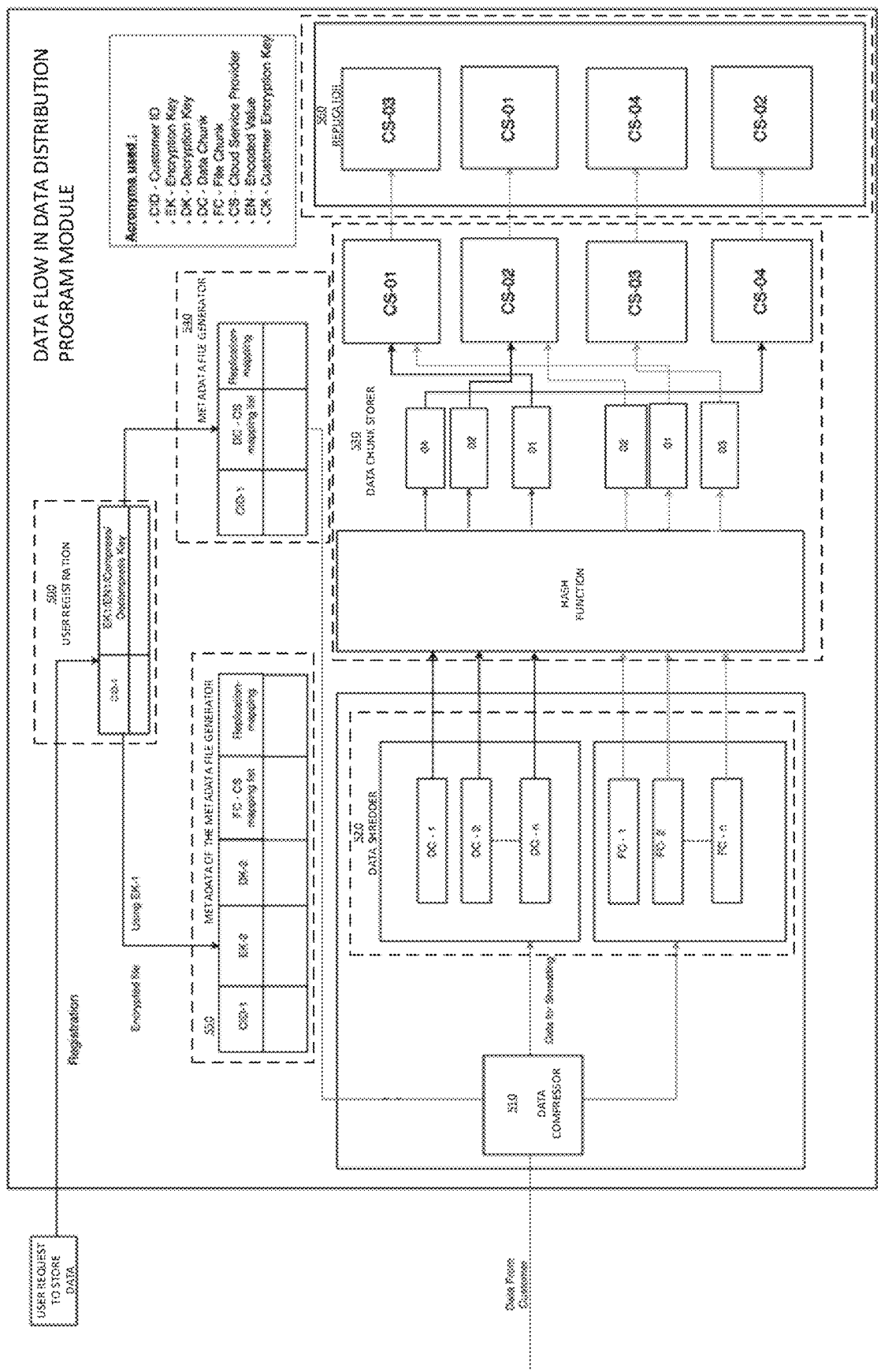
FIG. 6 depicts an illustrative data flow between components of an exemplary data distribution program module in accordance with aspects of the invention.

FIG. 5 depicts a block diagram of an exemplary data distribution program module 420 in the cloud computing server 410-1, 410-2, . . . , 410-n (of FIG. 4) in accordance with aspects of the invention, and FIG. 6 depicts an illustrative data flow between the components of the data distribution program module 420 in accordance with aspects of the invention. In embodiments, the data distribution program module 420 includes user registration 500, data compressor 510, data shredder 520, data chunk storer 530, metadata file generator 540, metadata of the metadata file generator 550, and replicator 560, each of which comprises one or more program modules 42 as described with respect to FIG. 1. In embodiments, the data distribution program module 420 may include additional or fewer components than those shown in FIG. 5. In embodiments, separate components may be integrated into a single computing component or module. Additionally, or alternatively, a single component may be implemented as multiple computing components or modules.

In embodiments, in response to the data distribution program module 420 of FIG. 5 receiving, via the client computer system 450, a request from a user (e.g., a customer) to store data in a multi-cloud environment as illustrated in FIG. 6, the user registration 500 registers the user in a user registration database. In aspects, the user registration database is an in-memory database supporting in-memory key-value storage.

In particular, the user registration 500 assigns a unique customer ID (CID) to the user (e.g., CID-1). In embodiments, the CID is only known to the data distribution program module 420. The user registration 500 then registers the user in the user registration database by storing the CID assigned to the user as a key along with an encryption key (EK) of the user (e.g., EK-1), an encoded value (EN) of the user (e.g., EN-1), and a compression/decompression key as values associated with the key. As discussed in more detail below, the EK is used to encrypt the metadata of the metadata file that is generated by the metadata of the metadata file generator 550, and the EN provides the path to the metadata of the metadata file when decoded.

In embodiments, subsequent to the data distribution program module 420 receiving the request from the user to store data in a multi-cloud environment and registering the user in the user registration database, the data compressor 510 of FIG. 5 receives encrypted data from the user via the client computer system 450, as illustrated in FIG. 6. The encryption key for the data (as well as the decryption key for the data) are only known to the user who provides the encrypted data to the data compressor 510.

The data compressor 510 compresses the received encrypted data using the compression key stored in the user registration database by the user registration 500. By compressing the encrypted data received from the user, the data compressor 510 improves the efficiency of space utilization on the cloud providers in the multi-cloud environment.

In embodiments, the data shredder 520 of FIG. 5 receives the compressed encrypted data from the data compressor 510 and performs data shredding, as illustrated in FIG. 6. In particular, the data shredder 520 divides the received compressed encrypted data into a plurality of data chunks DC-1, DC-2, . . . , DC-n using a binary shredding method.

Any number of data chunks may be used. For example, in embodiments, the data shredder 520 divides the compressed encrypted data into a number of data chunks that is equal to the number of cloud providers in the multi-cloud environment. Alternatively, in other embodiments, the data shredder 520 divides the compressed encrypted data into a number of data chunks that is greater or lesser than the number of cloud providers in the multi-cloud environment. The number of data chunks may be selected based upon security and performance considerations, with more data chunks leading to improved security but worse performance.

In embodiments, the data chunk storer 530 of FIG. 5 receives the plurality of data chunks DC-1, DC-2, . . . , DC-n from the data shredder 520, as illustrated in FIG. 6, and applies a hashing algorithm on each of the data chunks DC-1, DC-2, . . . , DC-n to generate a numeric value in a range that corresponds to the number of available storage locations (e.g., a number of cloud providers) in the multi-cloud environment. For example, if the multi-cloud environment includes four different cloud providers CS-1, CS-2, CS-3, CS-4 (and therefore four different storage locations), then the hashing algorithm used by the data chunk storer 530 generates a numeric value in the range of 1 to 4 when applied to each of the data chunks DC-1, DC-2, . . . , DC-n. In embodiments, the data chunk storer 530 determines a number of storage locations to use in the multi-cloud environment based upon security and performance considerations, with more storage locations (i.e., more cloud providers) leading to improved security but potentially at the expense of performance.

The data chunk storer 530 then takes each of the plurality of data chunks DC-1, DC-2, . . . , DC-n received from the data shredder 520 and stores each data chunk in the cloud service provider corresponding to the numeric value output by the hashing algorithm in response to receiving the data chunk as a key. For example, in the case where the data chunk DC-1 is input as the key to the hash function, the hash function may output the value of "4." In response to the has function outputting the value of "4," the data chunk storer 530 stores the data chunk DC-1 in a fourth cloud service provider (e.g., CS-4).

According to another embodiment, instead of using the hash function, the data chunk storer 530 uses range partitioning to determine a storage location of each of the plurality of data chunks DC-1, DC-2, . . . , DC-n received from the data shredder 520.

In embodiments, the data chunk storer 530 maintains a mapping between each data chunk DC-1, DC-2, . . . , DC-n and the corresponding cloud service provider CS-1, CS-2, . . . , CS-n, where the data chunk is stored. This mapping is stored by the metadata file generator 540, as discussed below.

In embodiments, the metadata file generator 540 of FIG. 5 generates a metadata file that includes information for retrieving and reassembling the plurality of data chunks DC-1, DC-2, . . . , DC-n generated by the data shredder 520. In particular, the metadata file generator 540 generates a metadata file that includes the unique customer ID assigned by the user registration 500 (e.g., CID-1) as well as the mapping of the data chunks DC-1, DC-2, . . . , DC-n to the corresponding cloud service providers CS-1, CS-2, . . . , CS-n, where the data chunks are stored, maintained by the data chunk storer 530. In other words, the metadata file generated by the metadata file generator 540 includes information regarding which data chunk of the data chunks DC-1, DC-2, . . . , DC-n is stored in which cloud service provider CS-1, CS-2, . . . , CS-n.

The metadata file generated by the metadata file generator 540 also includes information regarding a replication mapping. In particular, the replication mapping indicates which data chunk of the data chunks DC-1, DC-2, . . . , DC-n is replicated on which cloud service provider CS-1, CS-2, . . . , CS-n.

After the metadata file generator 540 generates the metadata file, the metadata file generator 540 encrypts the metadata file with an encryption key (e.g., EK-2). Next, as illustrated in FIG. 6, the metadata file generator 540 passes the encrypted metadata file to the data compressor 510, which compresses the encrypted metadata file. The data compressor 510 then passes the compressed metadata file to the data shredder 520, as illustrated in FIG. 6, and the data shredder 520 shreds the compressed metadata file into metadata file chunks FC-1, FC-2, . . . , FC-n.

The metadata file chunks generated by the data shredder 520 are then passed to the data chunk storer 530, as illustrated in FIG. 6, and the data chunk storer 530 takes each of the plurality of metadata file chunks FC-1, FC-2, . . . , FC-n received from the data shredder 520 and stores each metadata file chunk in the cloud service provider corresponding to the numeric value output by the hashing algorithm in response to receiving the metadata file chunk as a key.

For example, in the case where the metadata file chunk FC-1 is input as the key to the hash function, the hash function may output the value of "2." In response to the has function outputting the value of "2," the data chunk storer 530 stores the metadata file chunk FC-1 in a second cloud service provider (e.g., CS-2). Accordingly, additional security is provided by shredding and distributing the metadata file, which is necessary to reconstruct the encrypted data received from the user by the data compressor 510.

In embodiments, the data chunk storer 530 maintains a mapping of the file chunks FC-1, FC-2, . . . , FC-n to the corresponding cloud service providers CS-1, CS-2, . . . , CS-n, where the file chunks are stored. This mapping is stored by the metadata of the metadata file generator 550, as discussed below.

Still referring to FIG. 5, the metadata of the metadata file generator 550 generates a metadata of the metadata file that includes information for retrieving the metadata file generated by the metadata file generator 540. In particular, the metadata of the metadata file includes information used to reconstruct the metadata file generated by the metadata file generator 540. Specifically, the metadata of the metadata file includes information about a CID assigned to the user (e.g., CID-1) by the user registration 500, the encryption key (e.g., EK-2) used by the metadata file generator 540 to encrypt the metadata file, the decryption key (e.g., DK-2) used to decrypt the metadata file, and the mapping between the file chunks FC-1, FC-2, . . . , FC-n of the metadata and the cloud service providers CS-1, CS-2, . . . , CS-n where the file chunks are stored.

The metadata of the metadata file generated by the metadata of the metadata file generator 550 also includes information regarding a replication mapping. In particular, the replication mapping indicates which file chunk of the file chunks FC-1, FC-2, . . . , FC-n is replicated on which cloud service provider CS-1, CS-2, . . . , CS-n.

The metadata of the metadata file generated by the metadata of the metadata file generator 550 is encrypted using an encryption key (e.g., EK-1) which is stored in the user registration database by the user registration 500. The metadata of the metadata file generator 550 then stores the encrypted metadata of the metadata file at a location in or accessible to the cloud computing server 410-1, 410-2, . . . , 410-n. Path information indicating this storage location of the metadata of the metadata file generated by the metadata of the metadata file generator 550 is encoded to generate an encoded value (e.g., EN-1) which is passed from the metadata of the metadata file generator 550 to the user registration 500, which stores the encoded value in the user registration database.

Still referring to FIG. 5, the replicator 560 maintains a backup of the data chunks DC-1, DC-2, . . . , DC-n and the file chunks FC-1, FC-2, . . . , FC-n so that they can be recovered if any one of the cloud service provider CS-1, CS-2, . . . , CS-n goes down or crashes. For example, the data stored by the data chunk storer 530 in CS-1 is passed to the replicator 560, as illustrated in FIG. 6, and the replicator 560 replicates the data from CS-1 in CS-3. Additionally, the data stored in CS-2 is replicated in CS-1, the data stored in CS3 is replicated in CS-4, and the data stored in CS-4 is replicated in CS-2.

Referring back to FIG. 4, the data aggregation program module 430 in the cloud computing server 410-1, 410-2, . . . , 410-n (of FIG. 4) provides for the retrieval and reconstruction of data stored by a user using the data distribution program module 420, as described above with respect to FIG. 5, and FIG. 7 depicts an illustrative data flow in the data distribution program module 420 in accordance with aspects of the invention. In particular, the data aggregation program module 430, in response to a request from a user, via the client computer system 450, to retrieve data, queries the user registration database using the CID assigned to the user (e.g., CID-1) to retrieve the encoded value of the user (e.g., EN-1), as illustrated in FIG. 7.

Next, the encoded value of the user (e.g., EN-1) is decoded by the data aggregation program module 430 to determine the path information for the metadata of the metadata file generated by the metadata of the metadata file generator 550. After determining the path information, the data aggregation program module 430 then retrieves the metadata of the metadata file and decrypts it using the encryption key (e.g., EK-1) associated with the user, as illustrated in FIG. 7. (Note that the same key, EK-1, may be used for both encryption and decryption.)

After decrypting the metadata of the metadata file, the data aggregation program module 430 obtains the file chunk to cloud service provider mapping list from the metadata of the metadata file. Using the file chunk to cloud service provider mapping list, the data aggregation program module 430 retrieves the file chunks FC-1, FC-2, . . . , FC-n which are distributed across the cloud service provider CS-1, CS-2, . . . , CS-n, as illustrated in FIG. 7.

Figure 7:
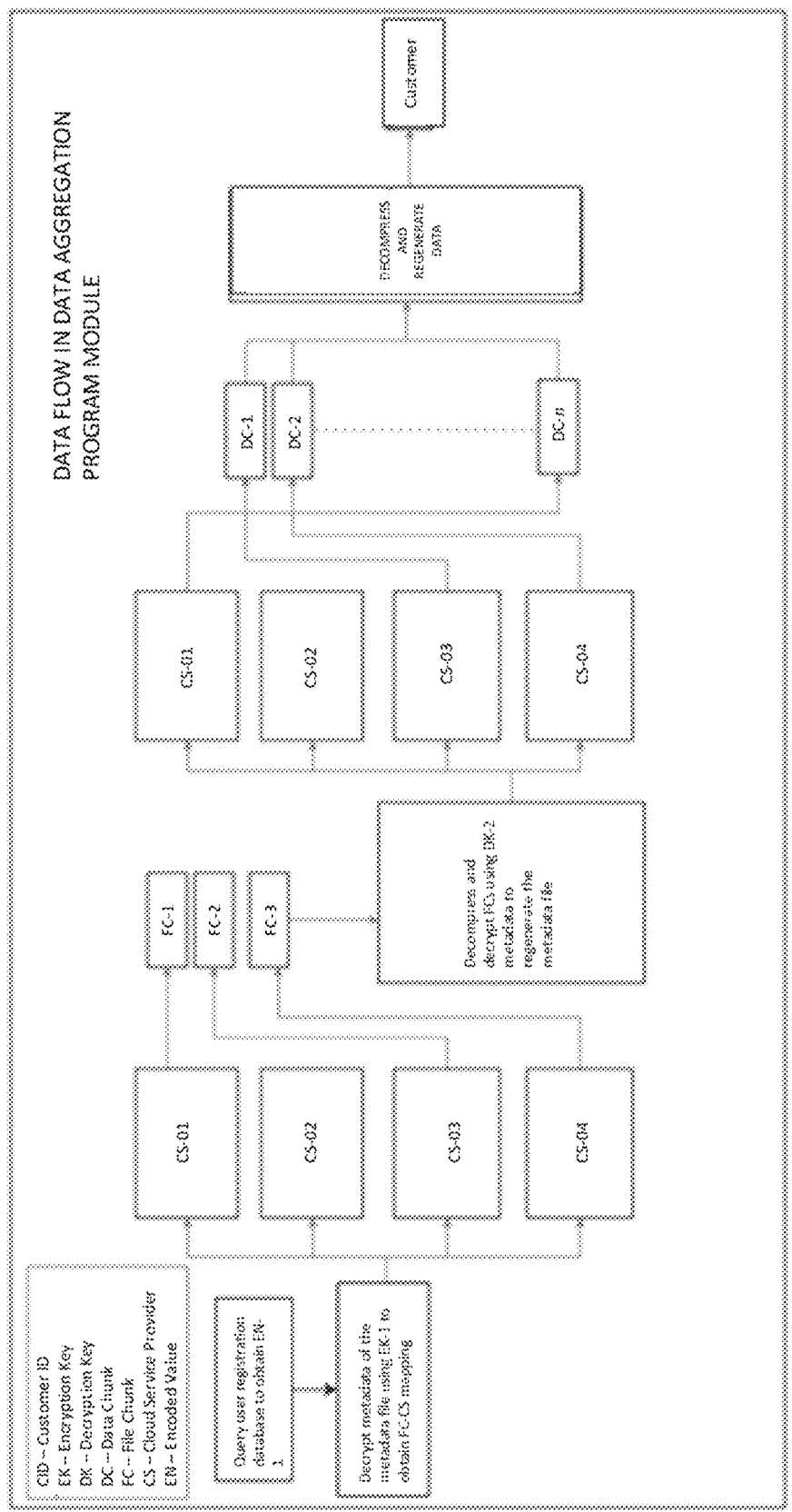
FIG. 7 depicts an illustrative data flow in an exemplary data distribution program module in accordance with aspects of the invention.

Next, the data aggregation program module 430 decompresses the retrieved file chunks FC-1, FC-2, . . . , FC-n and then decrypts the file chunks FC-1, FC-2, . . . , FC-n using the decryption key (e.g., DK-2) stored in the metadata of the metadata file to regenerate the metadata file originally generated by the metadata file generator 540, as illustrated in FIG. 7.

Once the metadata file is regenerated by the data aggregation program module 430, the data aggregation program module 430 retrieves the data chunk to cloud service provider mapping list from the metadata file. Using the data chunk to cloud service provider mapping list, the data aggregation program module 430 retrieves the data chunks DC-1, DC-2, . . . , DC-n which are distributed across the cloud service provider CS-1, CS-2, . . . , CS-n, as illustrated in FIG. 7.

Finally, the data aggregation program module 430 builds the compressed data from the retrieved data chunks DC-1, DC-2, . . . , DC-n, as illustrated in FIG. 7. The data aggregation program module 430 then decompresses the data and sends the decompressed, encrypted data back to the user who requested to retrieve the data, via the client computer system 450, as illustrated in FIG. 7. The user then decrypts the decompressed, encrypted data using a decryption key for the data that is only known to the user.

In embodiments, a service provider could offer to perform the processes described herein. In this case, the service provider can create, maintain, deploy, support, etc., the computer infrastructure that performs the process steps of the invention for one or more customers. These customers may be, for example, any business that uses cloud computing technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
   receiving, by a computing device, data to be stored in a distributed computing environment;
   compressing, by the computing device, the received data;
   shredding, by the computing device, the compressed data into a plurality of data chunks;
   storing, by the computing device, the plurality of data chunks in a plurality of locations in the distributed computing environment;
   generating, by the computing device, a metadata file including a mapping of each of the plurality of data chunks and a corresponding location of the plurality of locations in the distributed computing environment in which each of the plurality of data chunks is stored;
   shredding, by the computing device, the metadata file into a plurality of file chunks; and
   storing, by the computing device, the plurality of file chunks in the distributed computing environment, wherein the shredding of the metadata file and the storing of the plurality of file chunks is separate from the shredding of the compressed data and the storing of the plurality of data chunks, and wherein the plurality of file chunks may be retrieved to regenerate the metadata file, and the regenerated metadata file may be utilized to locate and retrieve the plurality of data chunks.

2. The method according to claim 1, further comprising receiving the data to be stored in the distributed computing environment as encrypted data.

3. The method according to claim 1, wherein the shredding the compressed data into a plurality of data chunks comprises using a binary shredding method.

4. The method according to claim 1, wherein the storing the plurality of data chunks in the plurality of locations in the distributed computing environment comprises, for each data chunk:
   using a hashing algorithm on the data chunk to generate a numeric value in a range that corresponds to a number of storage locations available in the distributed computing environment; and
   storing the data chunk in a storage location in the distributed computing environment that corresponds to the generated numeric value.

5. The method according to claim 1, wherein the generating the metadata file further comprises encrypting the metadata file.

6. The method according to claim 1, further comprising:
   generating, by the computing device, a metadata of the metadata file, wherein the metadata of the metadata file includes information for reconstructing the metadata file from the plurality of file chunks;
   encoding, by the computing device, path information indicating a storage location of the metadata of the metadata file to generate an encoded value of a user; and
   storing, by the computing device, the encoded value of the user in a database, wherein the user may retrieve the encoded value of the user to retrieve the metadata of the metadata file.

7. The method according to claim 6, further comprising encrypting the metadata of the metadata file.

8. The method of claim 1, further comprising replicating each of the plurality of stored data chunks and each of the plurality of stored file chunks to at least one other storage location in the distributed computing environment.

9. A computer program product comprising a computer readable storage medium having program instructions embodied therewith, the program instructions executable by a computing device to cause the computing device to:
   receive data to be stored in a distributed computing environment;
   shred the received data into a plurality of data chunks;
   determine a first plurality of locations to utilize in the distributed computing environment, wherein each of the first plurality of locations is associated with a different cloud service provider;
   store each of the plurality of data chunks in corresponding ones of the first plurality of locations in the distributed computing environment;
   generate a metadata file including a mapping of each of the plurality of data chunks to the corresponding ones of the first plurality of locations in the distributed computing environment in which each of the plurality of data chunks is stored;
   shred the metadata file into a plurality of file chunks;
   store each of the plurality of file chunks in a corresponding one of a second plurality of locations in the distributed computing environment;
   generate a metadata of the metadata file, wherein the metadata of the metadata file includes a mapping of each of the plurality of file chunks to the corresponding location of the second plurality of locations in which the file chunks are stored;

encode the metadata; and store the encoded metadata in a database, wherein the shredding of the metadata file and the storing of the plurality of file chunks is separate from the shredding of the compressed data and the storing of the plurality of data chunks, wherein the plurality of file chunks may be retrieved to regenerate the metadata file by retrieving the encoded metadata from the database and using the mapping within the metadata to locate the plurality of file chunks; and wherein the regenerated metadata file may be utilized to locate and retrieve the plurality of data chunks to regenerate the data.

10. The computer program product according to claim 9, wherein the data to be stored in the distributed computing environment is received as encrypted data.

11. The computer program product according to claim 9, wherein the shredding the compressed data into the plurality of data chunks comprises using a binary shredding method.

12. The computer program product according to claim 9, wherein the storing the plurality of data chunks in the first plurality of locations in the distributed computing environment comprises, for each data chunk:

using a hashing algorithm on the data chunk to generate a numeric value in a range that corresponds to a number of storage locations available in the distributed computing environment; and storing the data chunk in a storage location in the distributed computing environment that corresponds to the generated numeric value.

13. The computer program product according to claim 9, wherein the generating the metadata file further comprises encrypting the metadata file.

14. The computer program product according to claim 13, wherein the encoding the metadata of the metadata file comprises encrypting the metadata of the metadata file.

15. The computer program product of claim 9, the program instructions further being executable by the computing device to cause the computing device to replicate each of the plurality of stored data chunks and each of the plurality of stored file chunks to at least one other storage location in the distributed computing environment.

16. A system comprising:

a hardware processor, a computer readable memory, and a computer readable storage medium associated with a computing device;

program instructions configured to receive data to be stored in a distributed computing environment;

program instructions configured to compress the received data;

program instructions configured to shred the compressed data into a plurality of data chunks;

program instructions configured to store the plurality of data chunks in a plurality of locations in the distributed computing environment;

program instructions configured to generate a metadata file including a mapping of each of the plurality of data chunks and a corresponding location of the plurality of locations in the distributed computing environment in which each of the plurality of data chunks is stored;

program instructions configured to shred the metadata file into a plurality of file chunks; and program instructions configured to store the plurality of file chunks in the plurality of locations in the distributed computing environment, wherein the shredding of the metadata file and the storing of the plurality of file chunks is separate from the shredding of the compressed data and the storing of the plurality of data chunks, and wherein the plurality of file chunks may be retrieved to regenerate the metadata file, and the regenerated metadata file may be utilized to locate and retrieve the plurality of data chunks, wherein the program instructions are stored on the computer readable storage medium for execution by the hardware processor via the computer readable memory.

17. The system according to claim 16, wherein the data to be stored in the distributed computing environment is received as encrypted data.

18. The system according to claim 16, wherein the storing the plurality of data chunks in a plurality of locations in the distributed computing environment comprises, for each data chunk:

using a hashing algorithm on the data chunk to generate a numeric value in a range that corresponds to a number of storage locations available in the distributed computing environment; and storing the data chunk in a storage location in the distributed computing environment that corresponds to the generated numeric value.

19. The system according to claim 16, wherein the generating the metadata file further comprises encrypting the metadata file.

20. The system according to claim 16, further comprising program instructions configured to generate a metadata of the metadata file, wherein the metadata of the metadata file includes information used to reconstruct the metadata file from the plurality of file chunks.

* * * * *